United States Patent
Kikuchi

(10) Patent No.: US 10,505,919 B2
(45) Date of Patent: Dec. 10, 2019

(54) PROGRAM, METHOD AND SYSTEM FOR AUTHENTICATING CONTROL DEVICE

(71) Applicant: FURUNO ELECTRIC CO., LTD., Nishinomiya (JP)

(72) Inventor: Ryota Kikuchi, Osaka (JP)

(73) Assignee: FURUNO ELECTRIC CO., LTD., Nishinomiya (JP)

(*) Notice: Subject to any disclaimer, the term of this patent is extended or adjusted under 35 U.S.C. 154(b) by 364 days.

(21) Appl. No.: 15/667,878

(22) Filed: Aug. 3, 2017

(65) Prior Publication Data

US 2018/0041498 A1    Feb. 8, 2018

(30) Foreign Application Priority Data

Aug. 4, 2016   (JP) .................. 2016-153487

(51) Int. Cl.
*H04L 29/06*    (2006.01)
*H04W 8/00*    (2009.01)
*H04W 12/06*    (2009.01)
*H04W 48/16*    (2009.01)

(52) U.S. Cl.
CPC ...... *H04L 63/0823* (2013.01); *H04L 63/0876* (2013.01); *H04L 63/101* (2013.01); *H04W 8/005* (2013.01); *H04W 12/06* (2013.01); *H04W 48/16* (2013.01)

(58) Field of Classification Search
CPC ............. G06F 2221/2107; G06F 21/64; G06F 21/629; G06F 21/50; G06F 21/51; G06F 21/44; H04L 12/2816
USPC ........................................................ 713/156
See application file for complete search history.

(56) References Cited

U.S. PATENT DOCUMENTS

| | | | | |
|---|---|---|---|---|
| 8,884,903 B2* | 11/2014 | Girault | ................... | B63B 49/00 345/173 |
| 2004/0243994 A1* | 12/2004 | Nasu | ........................ | G06F 8/65 717/171 |
| 2007/0283168 A1* | 12/2007 | Sakuma | .............. | G06F 21/6254 713/193 |
| 2015/0168935 A1* | 6/2015 | Lin | .................... | G05B 19/0421 700/17 |
| 2015/0295757 A1* | 10/2015 | Debate | .............. | G06F 16/90335 709/220 |
| 2017/0195827 A1* | 7/2017 | Vasko | ................... | H04W 12/08 |
| 2019/0079656 A1* | 3/2019 | Li | .......................... | H04L 29/08 |

OTHER PUBLICATIONS

Nadkarni et al, Preventing Accidental Data Disclosure in Modern Operating Systems, Nov. 8, 2013, ACM, pp. 1029-1041.*
Davi et al, Hardware-Assisted Fine-Grained Control-Flow Integrity: Towards Efficient Protection of Embedded Systems Against Software Explotation, Jun. 5, 2014, ACM, pp. 1-6.*

* cited by examiner

Primary Examiner — Luu T Pham
Assistant Examiner — Jenise E Jackson
(74) Attorney, Agent, or Firm — Xsensus LLP

(57) ABSTRACT

An authentication system, is provided, which includes a control device configured to confirm validity of using a program installed in the control device by confirming whether identification information of the control device satisfies a given condition, and to confirm whether the target device having a function to be used by the control device falls under a valid range of use based on device restriction information that indicates a restriction on the target device permitted to be used and is stored in the control device.

17 Claims, 8 Drawing Sheets

PROGRAM, METHOD AND SYSTEM FOR AUTHENTICATING CONTROL DEVICE

CROSS-REFERENCE TO RELATED APPLICATION(S)

This application claims priority under 35 U.S.C. § 119 to Japanese Patent Application No. 2016-153487, which was filed on Aug. 4, 2016, the entire disclosure of which is hereby incorporated by reference.

TECHNICAL FIELD

The present disclosure mainly relates to an authentication system for a control device.

BACKGROUND

Conventionally, authentication systems which include a control device and a target device to be controlled are known, where a control program is stored in both the devices, and the control device can control (use) the target device by accessing the target device while the program is launched.

With this configuration, since the target device and its functions to be controlled by the program are not restricted, the control device may attempt an unauthorized access to the target device and its functions which are out of a licensed range. Thus, if the program leaks outside due to unauthorized acquisition etc, the control device and the target device may be used by authorized person.

SUMMARY

The purpose of the present disclosure relates to reliably preventing an unauthorized use of a program which controls a control device and a target device to be controlled.

According to one aspect of the present disclosure, an authentication system with the following configuration may be provided. That is, the system may include a control device, and a target device to be controlled by the control device. The control device may include a validity verification module configured to confirm validity of using a program installed in the control device, by confirming whether identification information of the control device satisfies a given condition. The control device may also include a connecting target device/function verification module configured to confirm whether the target device having a function to be used by the control device falls under a valid range of use based on device restriction information that indicates a restriction on the target device permitted to be used and is stored in the control device.

According to another aspect of the present disclosure, a method of authenticating a control device may be provided. That is, the method may include confirming validity of using a program installed in the control device, by confirming whether identification information of the control device satisfies a given condition. The method may also include confirming whether a target device having a function to be controlled by the control device falls under a valid range of use based on device restriction information that indicates a restriction on the target device permitted to be used and is stored in the control device.

According to still another aspect of the present disclosure, a computer readable media configured to store a computer executable program in a non-transitory manner, which upon execution by a processor of a computer causes the computer to authenticate a control device, may be provided. The authenticating the control device may cause a computer to confirm validity of using a program by confirming whether identification information of the control device satisfies a given condition, and cause a computer to confirm whether a target device having a function to be controlled by the control device falls under a valid range of use based on device restriction information that indicates a restriction on the target device permitted to be used and is stored in the control device.

As described above, the control device may confirm the validity of using the program installed in the control device and confirm whether the target device to be used by the control device falls under the valid range. Therefore, an unauthorized use of the program may reliably be prevented.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

First Embodiment

Figure 1:
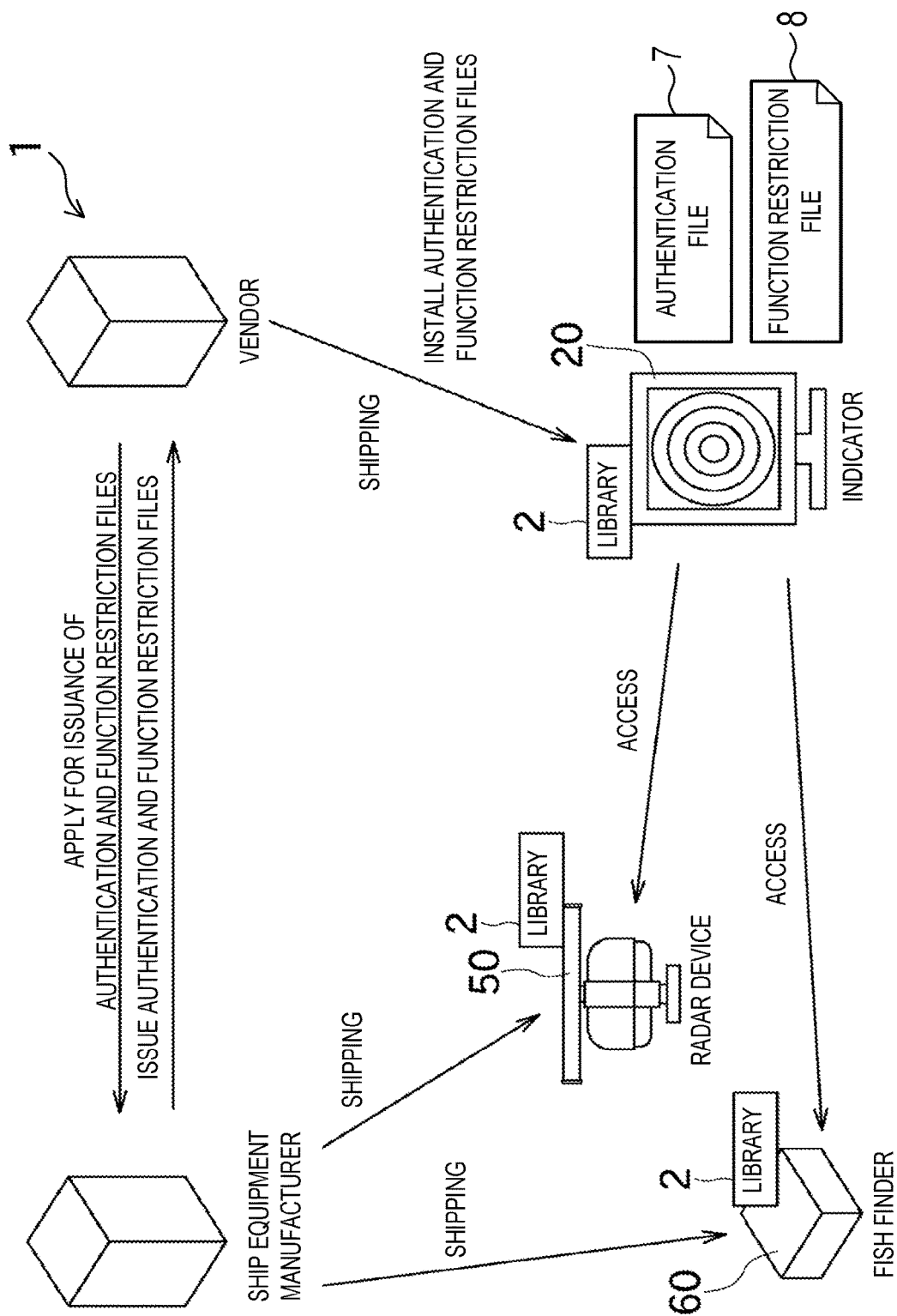
FIG. 1 is a schematic view illustrating an entire configuration of an authentication system for a control device according to a first embodiment of the present disclosure.
Figure 2:
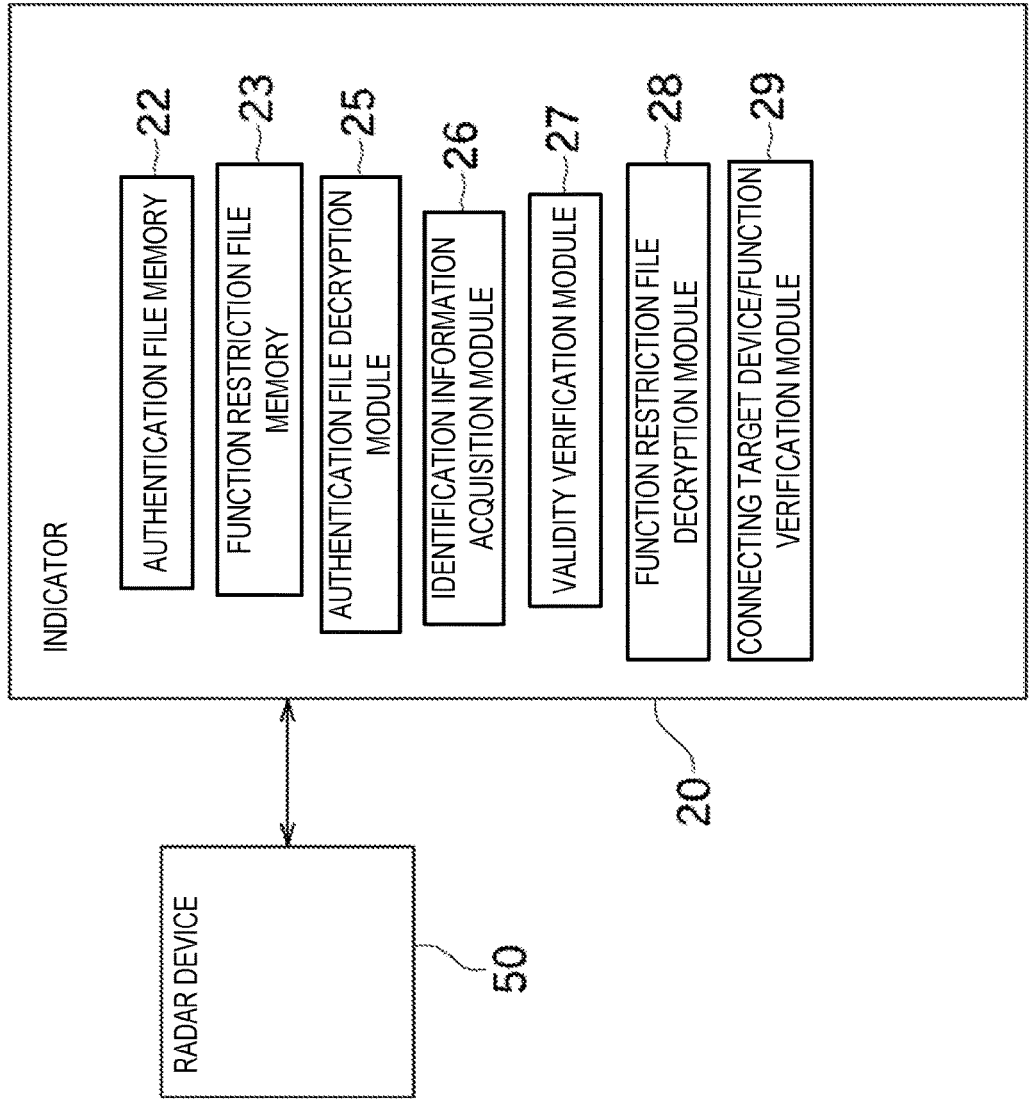
FIG. 2 is a block diagram illustrating a main configuration of the control device according to the first embodiment.

First, a first embodiment of the present disclosure is described with reference to the accompanying drawings. FIG. 1 is a schematic view illustrating an entire configuration of an authentication system 1 for a control device according to the first embodiment. FIG. 2 is a block diagram illustrating a main configuration of the control device according to the first embodiment.

The authentication system 1 for the control device of this embodiment may include a ship equipment manufacturer, a vendor, an indicator (control device) 20 manufactured by the vendor, a radar device (target device) 50, and a fish finder (target device) 60. The indicator 20 may be connected to the radar device 50 and the fish finder 60 via a network (not illustrated), for example, LAN.

The radar device 50 may perform a detection around itself by transmitting and receiving radio waves while rotating a radar antenna in a horizontal plane. The radar device 50 may be a product manufactured by the ship equipment manufacturer. The radar device 50 may be installed with a function providing program which allows another ship equipment (control device) to control the radar device 50, and a library (program) 2 used by the function providing program. Each of the function providing program and the library 2 may be created by the ship equipment manufacturer.

The fish finder 60 may detect a school of fish by transmitting ultrasonic waves underwater and receive echo signals caused by reflection of the ultrasonic waves. The fish finder 60 may be a product manufactured by the ship equipment manufacturer. The fish finder 60 may be installed with a function providing program which allows another ship equipment (control device) to control the fish finder 60, and a library 2 used by the function providing program.

The indicator 20 may output a detection result of the target device (e.g., the radar device 50 or the fish finder 60) on a display screen and control the target device. The indicator 20 of this embodiment may be a ship equipment manufactured by the vendor (manufacturer) different from the ship equipment manufacturer. The indicator 20 may be installed with a function using program created by the vendor so as to use a function of the target device, and a library 2 used by the function using program. This library 2 may be distributed by the ship equipment manufacturer to the vendor which entered into a license agreement with the ship equipment manufacturer, and be the same as those installed in the radar device 50 and the fish finder 60.

The ship equipment manufacturer may hold information on the vendor which entered into the license agreement with the ship equipment manufacturer, and information on the contents of the license agreement. Examples of the contents of the license agreement may include, but not limited to, an upper limit number of the indicators 20 which is permitted to use the library 2, a restriction on the type, model etc. of the target device of which the function may be used, and a restriction on the function of which use is permitted among all functions of the target device.

The vendor may enter, with the ship equipment manufacture, into the license agreement so that the indicator 20 manufactured by the vendor is permitted to use the target device (e.g., the radar device 50 or the fish finder 60).

The following description is given for a case where the vendor which manufactures and sells the indicator 20 does not have a license to use the fish finder 60, but has a license to use a function of the radar device 50 (not all the functions of the radar device 50 but only a radar detection function).

Next, a main configuration of the indicator 20 which is installed with the function using program and the library 2 is described in detail with reference to FIG. 2. The indicator 20 may mainly include an authentication file memory 22, a function restriction file memory 23, an authentication file decryption module 25, an identification information acquisition module 26, a validity verification module 27, a function restriction file decryption module 28, and a connecting target device/function verification module 29.

Particularly, the indicator 20 may be configured as a computer comprised of a computing unit which includes a CPU, and a memory which includes ROM(s), RAM(s). The memory may store the function using program and the library 2 described above. These software and hardware may cooperate with each other so that the indicator 20 operates as the authentication file memory 22, the function restriction file memory 23, the authentication file decryption module 25, the identification information acquisition module 26, the validity verification module 27, the function restriction file decryption module 28, and the connecting target device/function verification module 29, etc.

The authentication file memory 22 may store an authentication file 7 issued as a response to an application from the vendor. The vendor as an applicant may apply for issuance of an authentication file and a function restriction file to the ship equipment manufacturer so that the indicator 20 is permitted to use (control) the target device. At this time, the vendor may include in the application, information that the radar device 50 is the device of which function is requested to be used, information that out of all the functions of the radar device 50, only the radar detection function is requested to be used, and also device identification information of the indicator 20 searched beforehand. The device identification information may be any information as long as it uniquely identifies hardware of the indicator 20. In this embodiment, a MAC address assigned to a network interface card (NIC) which is provided to the indicator 20 may be used for the purpose of communication. The authentication file 7 may be described with the MAC address of the indicator 20 permitted to operate (device permission information), in an encrypted form by a suitable method. The encryption may be made using a symmetric key or an asymmetric key. The vendor may store the authentication file 7 in the authentication file memory 22 by saving it in a given folder.

The function restriction file memory 23 may store the function restriction file 8 as a response to an application from the vendor. In the function restriction file 8, information on a device which is permitted to be used by the indicator 20 (device restriction information) and information on a function of the device which is permitted to be used by the indicator 20 (function restriction information) may be described in an encrypted form by a known method. Here, the device restriction information may be, for example, information that the target device which is permitted to be used by the indicator 20 is restricted to the radar device 50. The function restriction information may be, for example, information that the indicator 20 is permitted to use the radar detection function but no other functions (e.g., radar sensitivity adjusting function). The vendor may store the function restriction file 8 in the function restriction file memory 23 by saving it in a given folder.

The authentication file decrypting module 25 may decrypt device permission information included in the authentication file 7 with a secret key stored in the library 2. By decrypting the device permission information of the authentication file 7, the MAC address of the indicator 20 permitted to operate may be obtained.

The identification information acquisition module 26 may acquire the MAC address assigned to the NIC provided to the indicator 20 for the purpose of communication.

The validity verification module 27 may confirm the validity of the indicator 20 using the library 2 installed in the indicator 20, by verifying whether the MAC address obtained by the authentication file decryption module 25 matches with the MAC address of the indicator 20 obtained by the identification information acquisition module 26.

The function restriction file decryption module 28 may change the encrypted device and function restriction information which are included in the function restriction file 8, back to plain texts by decrypting them with a suitable method.

The connecting target device/function verification module 29 may analyze the plain texts obtained by the function restriction file decryption module 28 to acquire a connecting target device which the indicator 20 has the validity of use and the function which the indicator 20 is permitted to use (permitted function), and verify whether the indicator 20 has not fallen out of its valid range of use.

Figure 3:
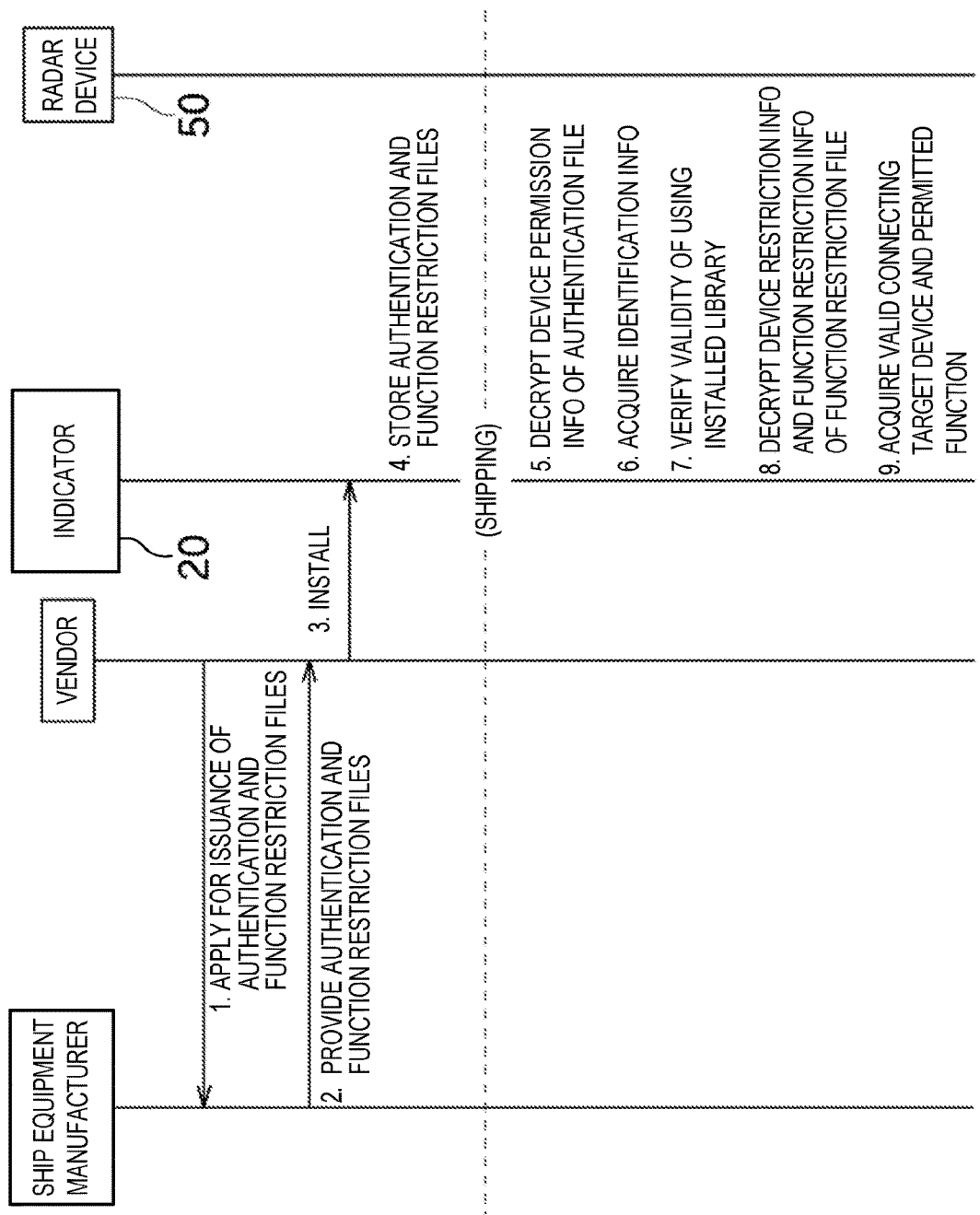
FIG. 3 is a sequence diagram illustrating a flow of processing mainly performed between the control device and a target device to be controlled, in order to confirm the validity of use.

Hereinafter, the authentication by the indicator 20 performed to confirm the validity of use may be described in detail with reference to FIGS. 3 and 4.

Initially, the vendor as the applicant may apply for issuance of the authentication file 7 and the function restriction file 8 to the ship equipment manufacturer (sequence No. 1).

The ship equipment manufacturer may confirm, based on the contents of the license agreement etc., whether the issuance application satisfies a given requirement, for example, whether the application is for the use within a licensed range to the vendor by the ship equipment manufacturer. If the requirement is satisfied, the ship equipment manufacturer may create the authentication file 7 and the function restriction file 8 and provide them to the vendor by a suitable method (sequence No. 2).

The authentication file 7 may include the device permission information obtained by suitably encrypting the device identification information (in this embodiment, the MAC address) of the indicator 20 corresponding to the application contents. Further, the function restriction file 8 may include information obtained by encrypting, with a suitable method, information for restricting the connecting target device and restricting the functions of the connecting target device to a part thereof according to the application contents (that is, device restriction information and function restriction information). In this embodiment, based on the application contents by the vendor, information for restricting the connecting target device to the radar device and restricting the permitted function to the radar detection function may be described in the function restriction file 8.

The vendor may install the received authentication file 7 and the function restriction file 8 in the indicator 20 by a suitable method (sequence No. 3).

The indicator 20 having the authentication file 7 and the function restriction file 8 installed therein, may store the authentication file 7 in the authentication file memory 22 and the function restriction file 8 in the function restriction file memory 23 (sequence No. 4). Then, the indicator 20 may be shipped from the vendor.

A case where a user uses the indicator 20 to, for example, display a radar detection result obtained by the radar device 50 may be considered here. In this case, the function using program of the indicator 20 may call the function of the library 2. At this time, the authentication file decryption module 25 of the indicator 20 may read the device permission information of the authorization file 7 and decrypt it back to a plain text (sequence No. 5). Thus, the MAC address of the indicator 20 permitted to operate may be acquired.

Subsequently, the identification information acquisition module 26 of the indicator 20 may acquire the MAC address assigned to the NIC which is provided to the indicator (sequence No. 6). The MAC address may easily be acquired by using an application program interface (API) provided to a basic software (OS) installed in the indicator 20.

Subsequently, the validity verification module 27 of the indicator 20 may verify whether the indicator 20 has the validity of using the library 2 installed therein, in other words, the validity of using the library 2 (sequence No. 7). For example, the validity verification module 27 may verify whether the MAC address obtained by the authentication file decryption module 25 matches with the MAC address of the indicator 20 obtained by the identification information acquisition module 26. If they match, it may be determined that there is validity, and if they do not match, it may be determined that there is no validity. If the validity verification module 27 determines that there is no validity, the library 2 may stop the operation without performing subsequent processing in order to prevent unauthorized use.

As a result, if the indicator 20 has the validity for using the library 2 installed therein, the function restriction file decrypting module 28 of the indicator 20 may read from the function restriction file memory 23 the encrypted device and function restriction information which are included in the function restriction file 8, and decrypt them by a suitable method back to plain texts (sequence No. 8).

Subsequently, the connecting target device/function verification module 29 of the indicator 20 may analyze the plain texts obtained by the function restriction file decryption module 28, to acquire the connecting target device and the permitted function of which the indicator 20 has the validity of use of, in other words, the connection is permitted by license (sequence No. 9).

Figure 4:
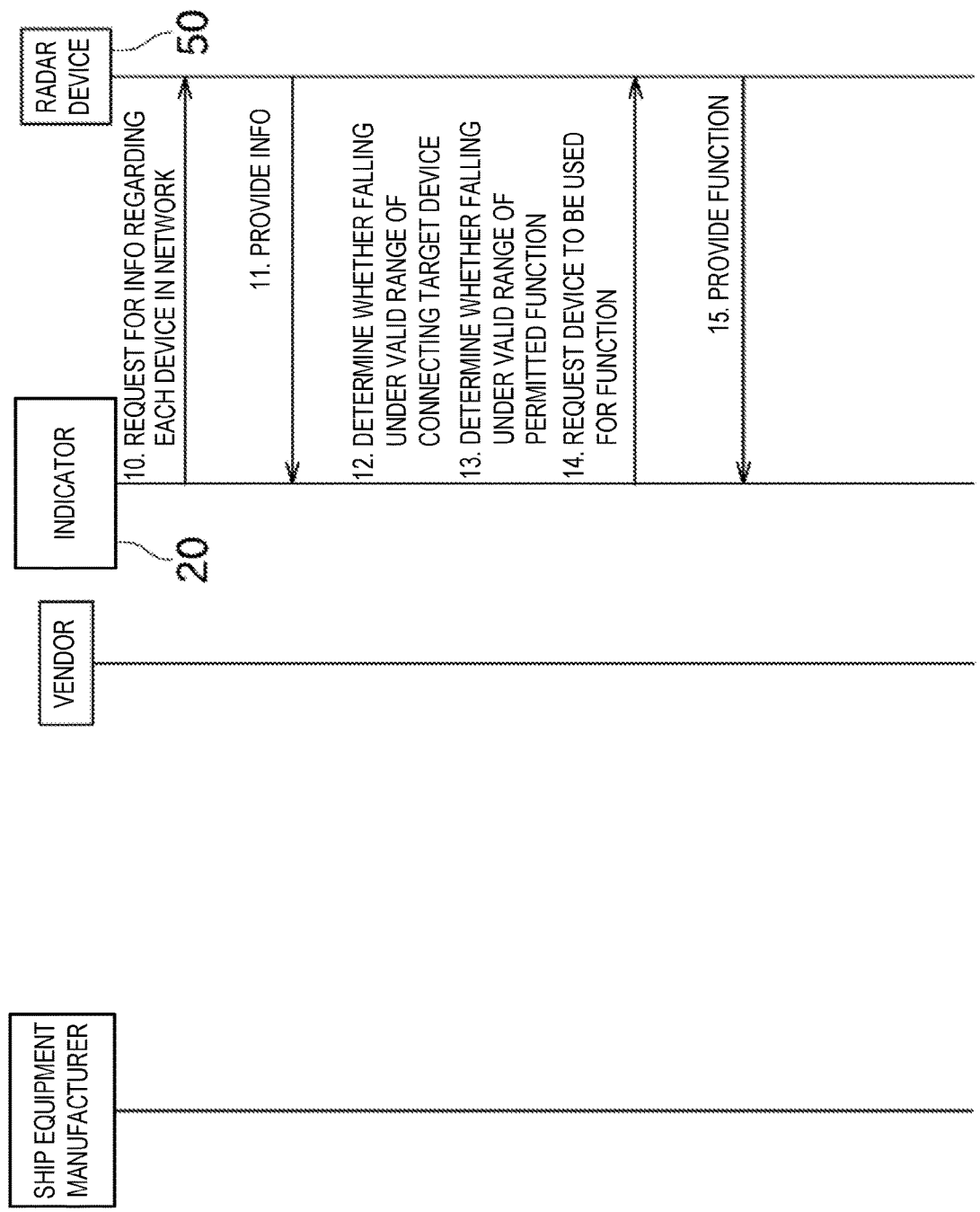
FIG. 4 is a sequence diagram illustrating the continuation of the processing of FIG. 3.

Then, the indicator 20 may be connected to the target devices connected to the network (in this embodiment, the radar device 50 and the fish finder 60), and request for information regarding the types of the target devices (sequence No. 10 in FIG. 4). In response to this request, the target devices may provide information on their types (sequence No. 11). For example, the radar device 50 may transmit information that it is the radar device to the indicator 20, and the fish finder 60 may transmit information that it is a fish finder to the indicator 20.

Based on the obtained information, the connecting target device/function verification module 29 of the indicator 20 may determine whether each target device falls under the valid range of the connecting target device acquired at sequence No. 9 (sequence No. 12). In this embodiment, the radar device 50 may be within the valid range of the connecting target device.

Further, the connecting target device/function verification module 29 may determine whether the function of the radar device 50 to be used falls under the valid range of the permitted function acquired at sequence No. 9 (sequence No. 13). In this embodiment, the radar detection function may be within the valid range of the permitted function.

Therefore, the indicator 20 may access the target device (in this embodiment, the radar device 50) falling under the valid range of the connecting target device and request for the function corresponding to an operation by the user, for example, the radar detection function (sequence No. 14). In response to this, the radar device 50 may provide the requested function (sequence No. 15).

Through the above processing, the indicator 20 may confirm the validity of using the library 2 by the indicator 20 and also confirm whether the target device (the radar device 50 in this embodiment) and its function (radar detection function) which are to be used by the indicator 20 fall under the valid range. Thus, the unauthorized use of the program for controlling the indicator 20 and the radar device 50 may reliably be prevented.

Note that, if the contents of the license agreement are changed etc., the vendor as the applicant may apply for an update of the function restriction file 8 to the ship equipment manufacturer. In this case, the vendor may create the updated function restriction file 8 accordingly and provide it to the vendor. Here, the vendor may install the updated function restriction file 8 in the indicator 20 to overwrite the previous function restriction file 8, and save the updated function restriction file 8.

Second Embodiment

Figure 5:
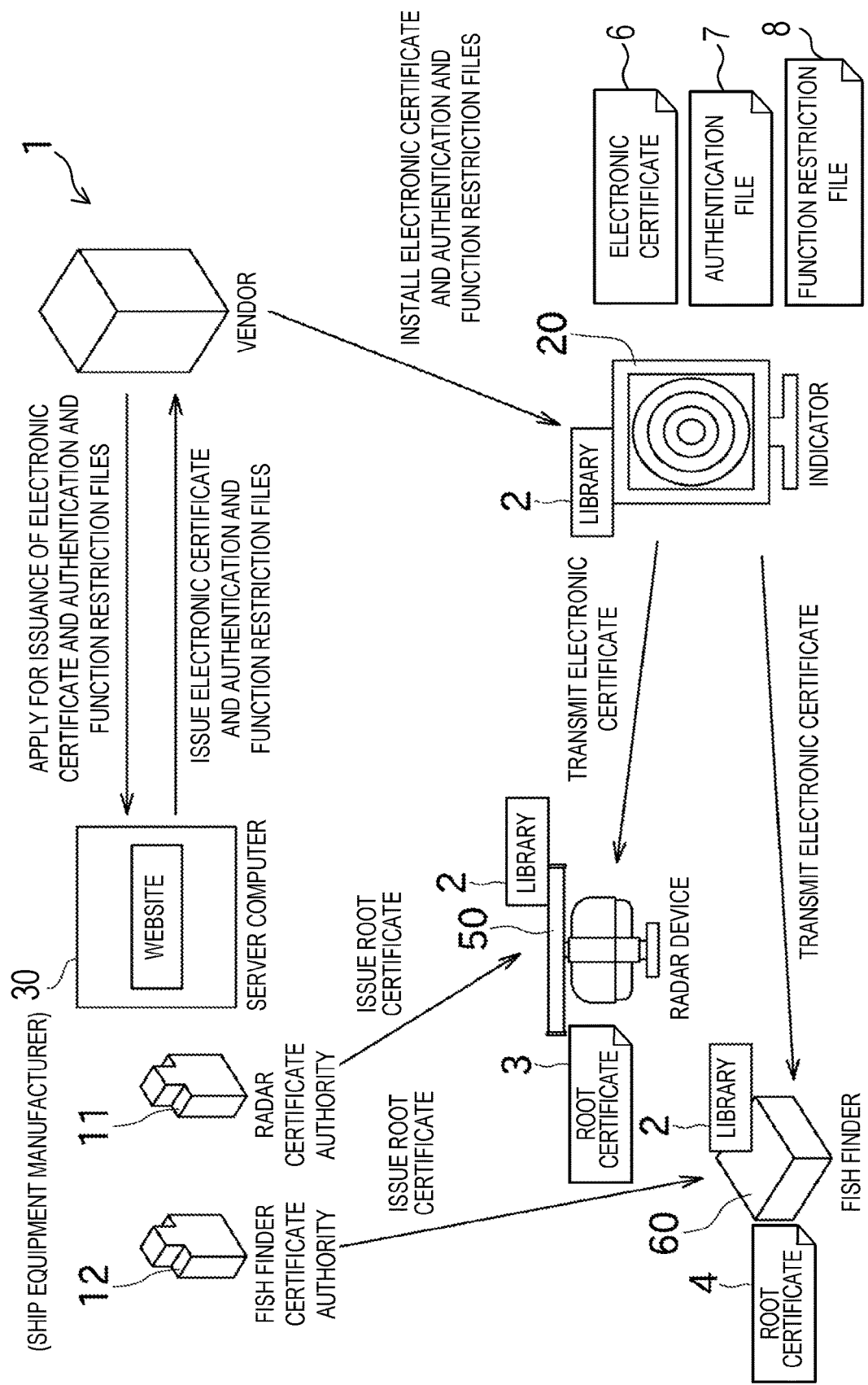
FIG. 5 is a schematic view illustrating an entire configuration of an authentication system for a control device according to a second embodiment of the present disclosure.
Figure 6:
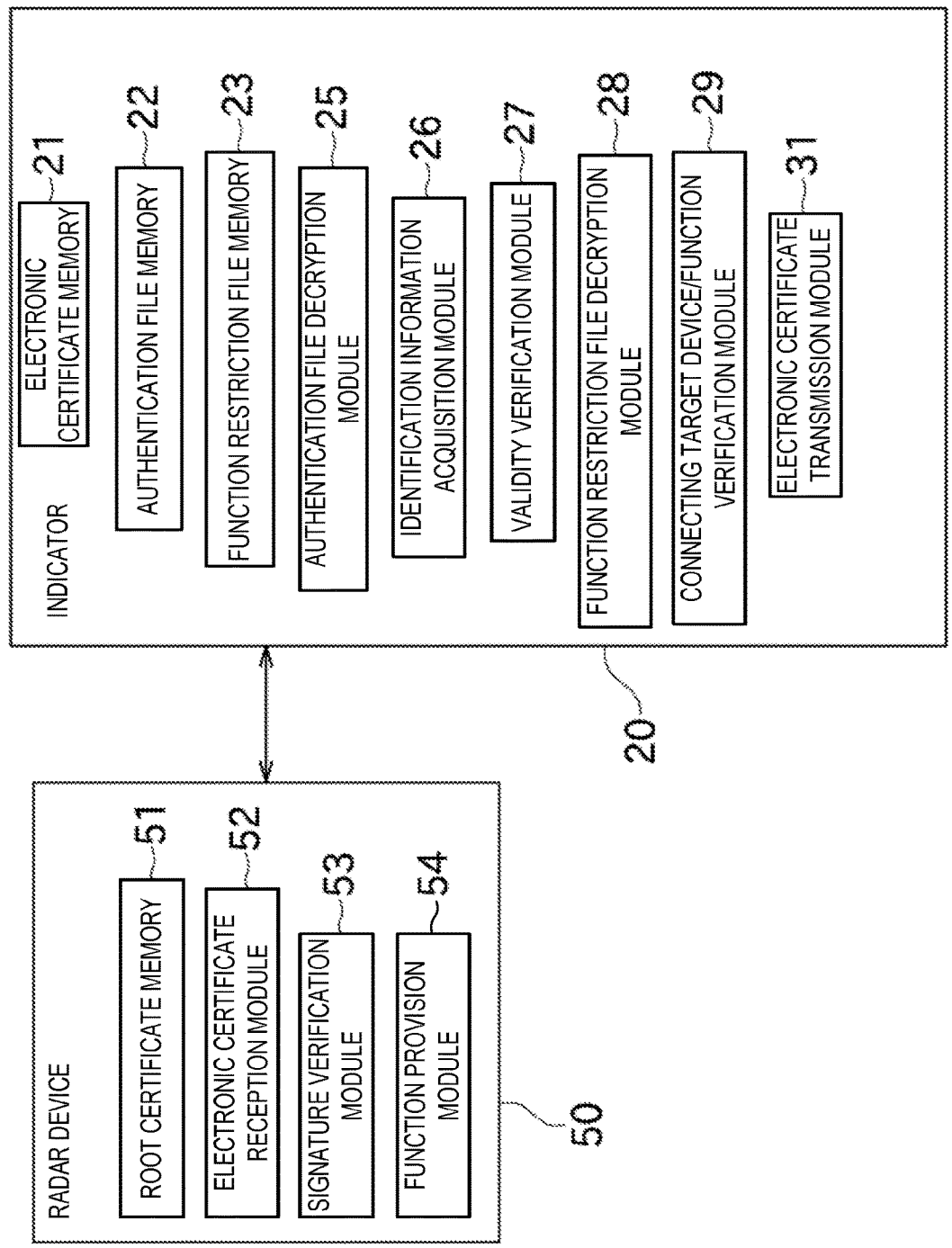
FIG. 6 is a block diagram illustrating a main configuration of the control device and a target device to be controlled in the second embodiment.
Figure 7:
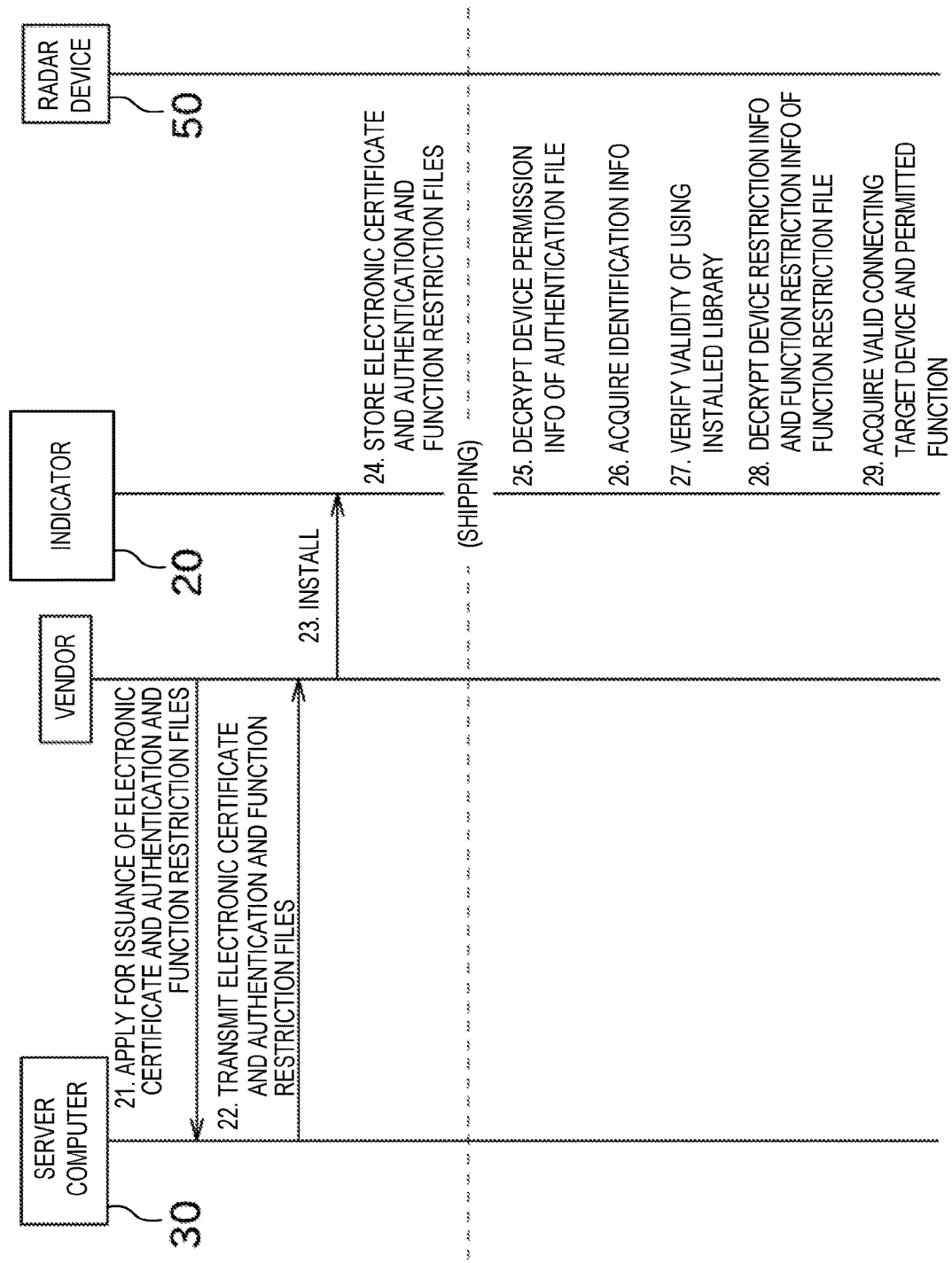
FIG. 7 is a sequence diagram illustrating a flow of processing mainly performed between the control device and the target device in order to confirm the validity of use.
Figure 8:
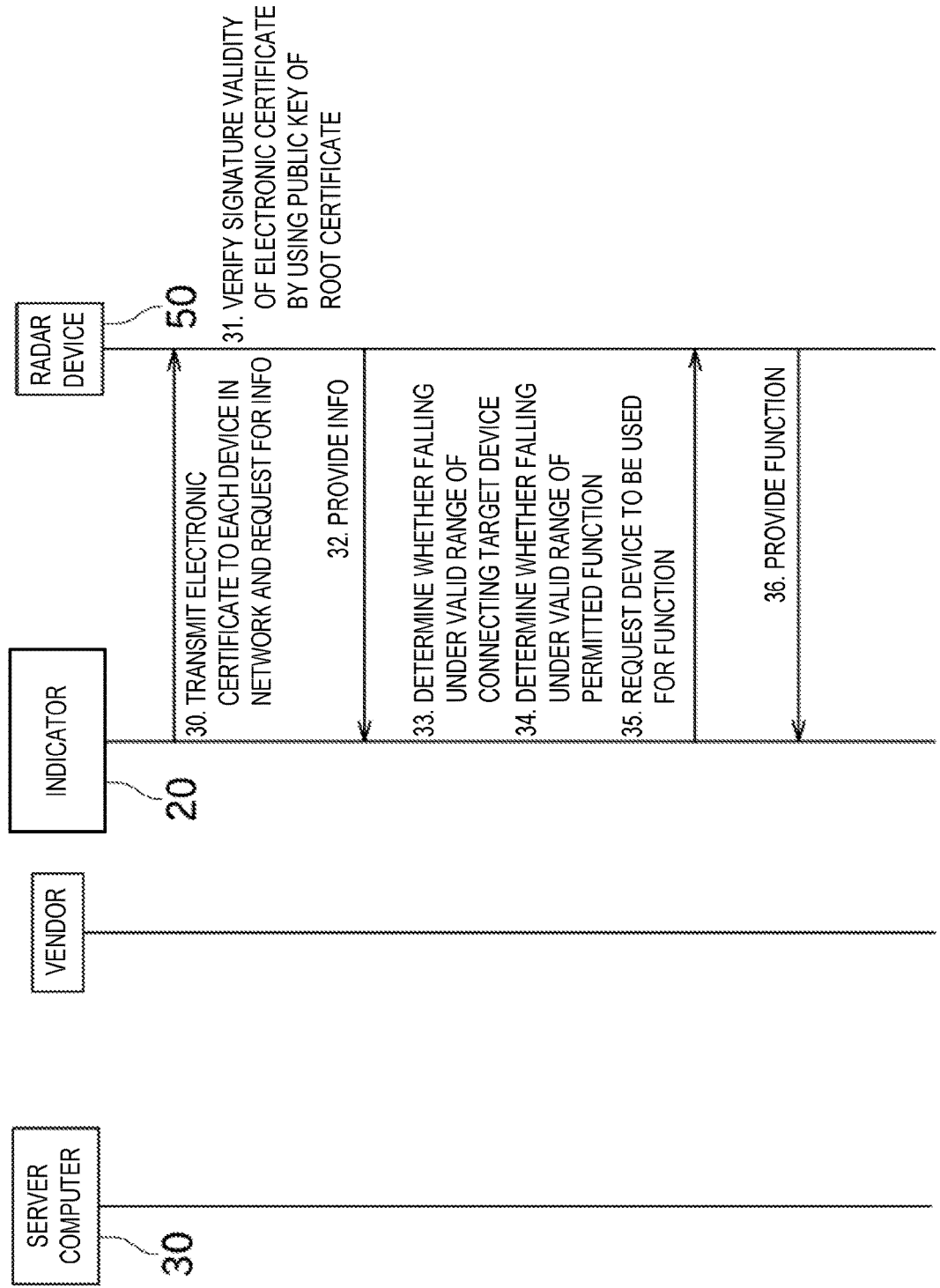
FIG. 8 is a sequence diagram illustrating the continuation of the processing of FIG. 7.

Next, a second embodiment of the present disclosure is described with reference to the accompanying drawings. In the following description, the same reference characters may be given to components having similar/same configurations to/as those of the first embodiment, and thus the detailed description thereof is omitted. FIG. 5 is a schematic view illustrating an entire configuration of an authentication system 1 for a control device according to the second embodiment of the present disclosure. FIG. 6 is a block diagram illustrating a main configuration of the control device and a target device in the second embodiment. FIG. 7 is a sequence diagram illustrating a flow of processing mainly performed between the control device and the target device in order to confirm the validity of use. FIG. 8 is a sequence diagram illustrating the continuation of the processing of FIG. 7.

As illustrated in FIG. 5, the authentication system 1 for the control device of this embodiment may include a plurality of certificate authorities 11 and 12, an indicator (control device) 20 manufactured by the vendor, a radar device (target device) 50, and a fish finder (target device) 60. The indicator 20 may be connected to the radar device 50 and the fish finder 60 via a network (not illustrated), for example, LAN.

In this embodiment, when selling the radar device 50, a ship equipment manufacturer may cause, among the plurality of certificate authorities (root certificate authorities) 11 and 12 built for each type of the target devices, the radar certificate authority 11 corresponding to the radar device 50 to issue a root certificate 3. The radar device 50 may be shipped in a state where this root certificate 3 is installed. Similarly, when selling the fish finder 60, the ship equipment manufacturer may cause, among the plurality of certificate authorities, the fish finder certificate authority 12 corresponding to the fish finder 60 to issue a root certificate 4. The fish finder 60 may be shipped in a state where this root certificate 4 is installed.

The ship equipment manufacturer may manage a website published on the Internet, and a server computer 30 on which the web server application runs may be installed with a program for automatically issuing a file etc. required for a library 2 to substantially operate on the indicator 20. Further, the server computer 30 may have a database (not illustrated) storing information on the vendor which entered into a license agreement with the ship equipment manufacturer, and also contents of the license agreement.

The radar certificate authority 11 and the fish finder certificate authority 12 described above may be private certificate authorities managed by the ship equipment manufacturer. The respective certificate authorities 11 and 12 may be built in a computer (not illustrated) electrically connected to the server computer 30.

Next, the main configuration of the indicator 20 installed with the function using program and the library 2 is described in detail with reference to FIG. 6. The indicator 20 may mainly include an electronic certificate memory 21, an authentication file memory 22, a function restriction file memory 23, an authentication file decryption module 25, an identification information acquisition module 26, a validity verification module 27, a function restriction file decryption module 28, a connecting target device/function verification module 29, and an electronic certificate transmission module 31.

The authentication file memory 22, the function restriction file memory 23, the authentication file decryption module 25, the identification information acquisition module 26, the validity verification module 27, the function restriction file decryption module 28, and the connecting target device/function verification module 29 among the above modules may be similar to/same as those in the first embodiment, and thus the description thereof is omitted.

The electronic certificate memory 21 may store an electronic certificate issued by the certificate authority 11. The vendor as an applicant may access the website described above via the Internet so as to apply for issuance of the electronic certificate, an authentication file, and a function restriction file, so that the indicator 20 may use (control) the target device. At this time, the vendor may include in the application, information that the radar device 50 is the device of which function is requested to be used, information that out of all the functions of the radar device 50, only the radar detection function is requested to be used, and also device identification information (for example, a MAC address) of the indicator 20 searched beforehand. The server computer 30 (web application) may determine whether the contents of the application on the website matches with the contents of the license agreement between the ship equipment manufacturer and the vendor by referring to the above database. If the contents of the application match with the license agreement, the server computer 30 may automatically cause the certificate authority 11, which corresponds to the application contents, to issue a file of an electronic certificate 6 and transmit it to the vendor. The server computer 30 may also create the authentication file and the function restriction file and send them to the vendor. The vendor may store the received file of the electronic certificate 6 in the electronic certificate memory 21 by saving it in a given folder.

The electronic certificate transmission module 31 may transmit the electronic certificate 6 stored in the electronic certificate memory 21 to the target device, such as the radar device 50.

Next, a main configuration of the radar device 50 is described in detail with reference to FIG. 6. The radar device 50 may mainly include a root certificate memory 51, an electronic certificate reception module 52, a signature verification module 53, and a function provision module 54.

Particularly, the radar device 50 may be configured as a computer comprised of a computing unit which includes a CPU, and a memory which includes ROM(s), RAM(s). The memory may store the function using program and the library 2 described above. These software and hardware may cooperate with each other so that the radar device 50 operates as the root certificate memory 51, the electronic certificate reception module 52, the signature verification module 53, the function provision module 54, etc.

The root certificate memory 51 may store a trusted root certificate. For example, the ship equipment manufacturer may install a self-certificate issued by one of the certificate authorities 11 and 12 which corresponds to the target device (in the case of the radar device 50, the radar certificate authority 11), in the radar device 50 as a trusted root certificate.

The electronic certificate reception module 52 may receive the electronic certificate transmitted from the electronic certificate transmission module 31 of the indicator 20.

The signature verification module 53 may confirm the validity of the indicator 20 using the function of the radar device 50 by verifying the signature of the electronic certificate received by the electronic certificate reception module 52. That is, the signature verification module 53 may verify, based on the trusted root certificate 3, whether the electronic certificate 6 received from the indicator 20 is signed by the certificate authority trusted by the radar device 50. More specifically, the signature verification module 53 may decrypt the signature of the electronic certificate 6 by using a public key of the radar certificate authority 11 included in the root certificate stored in the root certificate memory 51. Thus, a hash value (digest value) of the contents of the electronic certificate 6 may be obtained. Separately, the signature verification module 53 may calculate a hash value of the contents described in the electronic certificate 6 (e.g., the organization name of the vendor, the organization name of the radar certificate authority 11, the expiration date of the certificate, etc.) by using a hash function. The signature verification module 53 may confirm whether the indicator 20 has the validity of using the function of the radar device 50 by verifying whether this calculated hash value and the hash value obtained by the decryption matches with each other.

The function provision module 54 may provide the requested function to the indicator 20 only when the signature verification module 53 determines that the indicator 20 has the validity of using the function of the radar device 50. Thus, the indicator 20 may use (control) the radar device 50.

Note that, the fish finder 60 may also include a root certificate memory, an electronic certificate reception module, a signature verification module, and a function provision module (not illustrated). These modules may correspond and have similar/same configurations and functions to/as the root certificate memory 51, the electronic certificate reception module 52, the signature verification module 53, and the function provision module 54 of the radar device 50, respectively, and thus the detailed description thereof is omitted.

Hereinafter, the authentication performed on the indicator 20 side and the authentication performed on the radar device 50 side so as to confirm the validity of use are described in detail with reference to FIGS. 7 and 8.

Initially, the vendor as the applicant may operate a suitable computer to access a website for application, and apply for issuance of the electronic certificate 6, the authentication file 7, and the function restriction file 8 via the network (sequence No. 21).

The web application which runs on the server computer 30 of the website may automatically confirm whether the issuance application satisfies a given requirement, for example, whether the application is for the use within the licensed range to the vendor by the ship equipment manufacturer. If the requirement is satisfied, the web application may cause the certificate authority corresponding to the application contents (if the application is for using the function of the radar device 50, the radar certificate authority 11) to issue the electronic certificate 6 in the form of a file. The web application may also create the authentication file 7 and the function restriction file 8 and automatically transmit the file of the electronic certificate 6, the authentication file 7, and the function restriction file 8 to the computer of the vendor side via the network (sequence No. 22).

The electronic certificate 6 issued by the radar certificate authority 11 may be described with suitable contents, for example, the organization name of the vendor which received the permission, the organization name of the radar certificate authority 11, the expiration date of the certificate, the public key, etc. The radar certificate authority 11 may calculate a hash value (digest value) of the contents of the electronic certificate 6 by using a hash function, and affix to the electronic certificate 6 a signature obtained by encrypting the hash value with a secret key of the radar certificate authority 11.

The vendor may install the received electronic certificate 6, the authentication file 7, and the function restriction file 8 in the indicator 20 by a suitable method (sequence No. 23).

The indicator 20 may store the electronic certificate 6 in the electronic certificate memory 21, the authentication file 7 in the authentication file memory 22, and the function restriction file 8 in the function restriction file memory 23 (sequence No. 24). Then, the indicator 20 may be shipped from the vendor.

The function using program may call the function of the library 2 according to a user using the indicator 20. Since the processing performed at this time (sequence No. 25 to 29) may be the same as that in the first embodiment (sequence No. 5 to 9 in FIG. 3), the description thereof is omitted.

When the validity of use is confirmed on the indicator 20 side, the indicator 20 may access each of the target devices connected to the network (the radar device 50 and the fish finder 60), to transmit the electronic certificate 6 stored in the electronic certificate memory 21 to the target devices, and request for information on the type of each target device (sequence No. 30 in FIG. 8).

The electronic certificate 6 from the indicator 20 may be received by the electronic certificate reception module 52 of the radar device 50. The radar device 50 may verify the validity of the signature of the received electronic certificate by using the trusted root certificate stored in the root certificate memory 51 (sequence No. 31). That is, the signature verification module 53 may verify whether the electronic certificate 6 received from the indicator 20 is signed by the certificate authority trusted by the radar device 50, by using the trusted root certificate 3. For example, the signature verification module 53 may decrypt the signature of the electronic certificate 6 by using the public key of the radar certificate authority 11 attached to the root certificate. Thus, a hash value (digest value) of the contents of the electronic certificate may be obtained. Separately, the signature verification module 53 may calculate a hash value of the contents described in the electronic certificate 6 by using a hash function. The signature verification module 53 may confirm whether the indicator 20 has the validity of using the function of the radar device 50 by verifying whether this calculated hash value and the hash value obtained by the decryption matches with each other. That is, if they match, it may be determined that there is validity of use, and if they do not match, it may be determined that there is no validity of use.

The radar device 50 may provide the information on itself in response to a request from the indicator 20 only when the signature verification module 53 determines that the indicator 20 has the validity of use (sequence No. 32). On the other hand, if it is determined that there is no validity of use, the radar device 50 may refuse to provide the information to the indicator 20. Note that, it is needless to say that once the provision of information is refused, even if the indicator 20 requests for the function again, the function provision module 54 of the radar device 50 may refuse the request.

Then, the indicator 20 may confirm the validity of the connecting target device and the function to be used. If it is confirmed that there is validity, the indicator 20 may request the radar device 50 to provide the function, and the radar device 50 may provide the requested function (sequence No. 33 to 36). Since this processing may be similar to/same as that of the first embodiment (sequence No. 12 to 15 in FIG. 4) described above, the description is omitted.

By the above processing, the indicator 20 may confirm the validity of itself using the library 2, and the radar device 50 may confirm whether the indicator 20 has the validity of using the function of the radar device 50. In other words, double authentication may be performed. The radar device 50 may be used (controlled) through the indicator 20 only after conforming to both of the authentications. Since the validity of use may be confirmed by both the indicator 20 and the radar device 50, the unauthorized use of the program may reliably be prevented.

Note that, in the above example, the device restriction information in the function restriction file 8 may include the information that the indicator 20 only has the validity of using the radar device 50. Therefore, even if the library 2 of the indicator 20 receives a request from the device using program to use the function of the target device other than the radar device 50 (e.g., the fish finder 60), it may consider that the use is unauthorized and refuse the request. Thus, the user may use the radar device 50 through the indicator 20, but not other target device. Even if the library 2 is falsified etc. without authorization and the indicator 20 accesses, for example, the fish finder 60, the fish finder 60 may fail to verify the electronic certificate unless the electronic certificate issued by the fish finder certificate authority 12 is installed in the indicator 20. As a result, the fish finder 60 may not provide the function to the indicator 20.

Further, the device restriction information in the function restriction file 8 may include the information that the indicator 20 only has the validity of using the radar detection function among all the functions of the radar device 50. Therefore, even if the library 2 of the indicator 20 receives a request from the device using program to use a function other than the radar detection function (e.g., the radar sensitivity adjusting function), it may consider that the use is unauthorized and refuse the request. Thus, the user may use the radar detection function of the radar device 50 through the indicator 20, but not other function.

The vendor indicator 20 may be installed with, instead of only one, but also two or more electronic certificates. For example, the vendor to which the license is granted by the ship equipment manufacturer may install in the indicator 20 both the electronic certificate issued by the radar certificate authority 11 and the electronic certificate issued by the fish finder certificate authority 12, so that verification result of the electronic certificate may be a match for both the radar device 50 and the fish finder 60. In this case, a single indicator 20 may simultaneously use the functions of the radar device 50 and the fish finder 60.

Note that, if the licensed contents from the ship equipment manufacturer to the vendor are changed etc., the vendor may reapply to the website described above, for example, to overwrite the electronic certificate memory 21, the authentication file memory 22, and the function restriction file memory 23 to store a newly issued electronic certificate file, authentication file, and function restriction file, respectively. Thus, the electronic certificate, the device restriction information, the function restriction information, etc. may be updated. In this manner, the permitted range of use of the target device by the indicator 20 may suitably and flexibly be restricted based on circumstances of the license etc.

As described above, the authentication system 1 of the first and second embodiments may include the indicator (control device) 20 and the radar device (target device) 50. The indicator 20 may include the validity verification module 27 which confirms the validity of using the library (program) 2 installed in the indicator 20, by confirming whether the device identification information (MAC address) satisfies the given condition. The indicator 20 may also include the connecting target device/function verification module 29 which confirms whether the radar device 50 of which the function is to be used by the indicator falls under the valid range based on the device restriction information stored therein.

As a result, the indicator 20 may confirm the validity of using the library 2 installed in the indicator 20 and determine whether the radar device 50 to be used by the indicator 20 falls under the valid range. Thus, the unauthorized use of the library 2 may reliably be prevented.

Further, the authentication system 1 of the first and second embodiments may update the device restriction information stored in the indicator 20.

This may make it easier to support changes in the license etc.

Further, in the authentication system 1 of the first and second embodiments, the connecting target device/function verification module 29 of the indicator 20 may confirm whether the radar device 50 of which the function is to be used by the indicator 20 falls under the valid range based on the device restriction information included in the function restriction file stored in the indicator 20.

Thus, the target device of which function is permitted to be used by the indicator 20 may suitably be restricted based on the circumstances of the license etc.

Further, the authentication system 1 of the first and second embodiments may update the device restriction information stored in the indicator 20.

This may make it easier to support changes in the license etc.

Further, in the authentication system 1 of the first and second embodiments, the connecting target device/function verification module 29 of the indicator 20 may confirm whether the function of the target device to be used by the indicator 20 (in the case of the above examples, whether the detection function of the radar device 50) falls under the valid range based on the function restriction information included in the function restriction file stored in the indicator 20.

Thus, the permitted range of use of the function of the radar device 50 by the indicator 20 may suitably be restricted based on the circumstances of the license etc.

Further, in the authentication system 1 of the first and second embodiments, the function restriction information included in the function restriction file stored in the indicator 20 may be updated.

This may make it easier to support changes in the license etc.

Further, in the authentication system 1 of the second embodiment, the target device may include the electronic certificate reception module 52, the signature verification module 53, and the function provision module 54. The electronic certificate reception module 52 may receive the electronic certificate 6 from the indicator 20 (control device). The signature verification module 53 may confirm the validity of the indicator 20 using the function of the target device by verifying the signature of the electronic certificate 6 received by the electronic certificate reception module 52. The function provision module 54 may provide the function required by the indicator 20 according to the verification result of the signature verification module 53.

Thus, the validity of use may be confirmed by both the indicator 20 and the radar device 50, which may reliably prevent unauthorized use of the program.

Further, in the authentication system 1 of the second embodiment, the electronic certificate 6 stored by the indicator 20 may be updated.

This may make it easier to support changes in the license etc.

Further, the authentication system 1 of the second embodiment may have the following configuration. That is, the radar device 50 may include the root certificate memory 51, the electronic certificate reception module 52, and the signature verification module 53. The root certificate memory 51 may store the root certificate 3 of the trusted radar certificate authority (certificate authority) 11 as the trusted root certificate. The electronic certificate reception module 52 may receive the electronic certificate from the indicator 20. The signature verification module 53 may confirm the validity of the indicator 20 by verifying with the root certificate 3, whether the electronic certificate 6 received by the electronic certificate reception module 52 is signed by the radar certificate authority 11 which is trusted by the radar device 50.

Thus, the validity of the indicator 20 may be reliably confirmed by the radar device 50.

Further, in the authentication system 1 of the second embodiment, the radar device 50 and the fish finder 60 may store, as the trusted root certificates, the root certificates 3 and 4 of the certificate authorities 11 and 12 of which conditions are satisfied by the radar device 50 and the fish finder 60 among the plurality of certification stations 11 and 12 which are built for each type of the target device.

Thus, even when a license is granted for each type of the target device (in the above example, the radar device or the fish finder), each of the radar device 50 and the fish finder 60 may suitably confirm the validity of the indicator 20.

Further, in the authentication system 1 of the second embodiment, for example, the radar certificate authority 11 may automatically issue the electronic certificate 6 to the vendor (applicant) when the issuance application for the electronic certificate 6 is performed via the network and the issuance application satisfies the given requirement.

Thus, issuing the electronic certificate 6 at the certificate authority 11 may become easier.

Further, in the authentication system 1 of the first and second embodiments, the contents of the issuance application may include the condition for the MAC address which is information for identifying the indicator 20. When the issuance application satisfies the given requirement, the vendor as the applicant may acquire the authentication file 7 including the device permission information in which the MAC address is encrypted. The indicator 20 may confirm the validity of using the library 2 installed in the indicator 20, by confirming whether the MAC address of the indicator 20 satisfies the condition based on the device permission information of the authentication file 7 stored in the indicator 20.

Thus, the indicator 20 may easily confirm the validity of using the library 2 in itself. Further, since the MAC address for identifying the indicator 20 which is permitted to use the library 2 may be encrypted, the unauthorized use by falsification may be prevented.

Further, in the authentication system 1 of the first and second embodiments, the device identification information may include the MAC address.

Thus, the validity may be confirmed upon reliably identifying the control device (the indicator 20).

Further, in the authentication system 1 of the first and second embodiments, all the control device and the target devices (the radar device 50 and the fish finder 60) may be ship equipments.

Thus, the valid use of the ship equipments may be secured.

Further, in the first and second embodiments, the authentication of the indicator 20 may be performed as follows. That is, the indicator 20 may confirm the validity of using the library (program) 2 installed in the indicator 20 by confirming whether the device identification information on itself satisfies the condition. Further, the indicator 20 may confirm whether the radar device 50 of which the function is to be used by the indicator 20 falls under the valid range, based on the device restriction information stored in the indicator 20.

Thus, the indicator 20 may confirm the validity of using of the library 2 installed in the indicator 20, and also confirm whether the radar device 50 to be used by the indicator 20 falls under the valid range. As a result, the unauthorized use of the library 2 may reliably be prevented.

Further, in the second embodiment, the authentication of the indicator 20 may be performed as follows. That is, the indicator 20 may confirm the validity of using the library 2 installed in the indicator 20 by confirming whether the MAC address of itself satisfies the condition. Moreover, the radar device 50 which provides the function requested by the indicator 20 may confirm the validity of the indicator 20 using the function of the radar device 50 by verifying the signature of the electronic certificate 6 received from the radar device 50.

Thus, since the validity of use may be confirmed by both the indicator 20 and the radar device 50, the unauthorized use of the library 2 may reliably be prevented.

In the first and second embodiments, the indicator 20 may execute the program of the library 2 to confirm the validity of using the library 2 by confirming whether the device identification information of the indicator 20 satisfies the condition, and to confirm whether the radar device 50 of which the function is to be used by the indicator 20 falls under the valid range, by confirming the device restriction information stored in the indicator 20.

Thus, the indicator 20 may confirm the validity of using the library 2 installed in the indicator 20, and confirm whether the radar device 50 to be used by the indicator 20 falls under the valid range. As a result, the unauthorized use of the library 2 may reliably be prevented.

The indicator 20 of the second embodiment may execute the program of the library 2 to confirm the validity of using the library 2 by confirming whether the device identification information (MAC address) of the indicator 20 satisfies the condition, and to transmit the electronic certificate 6 stored in the indicator 20 to the radar device 50 so that the radar device 50 may confirm the validity.

Thus, the validity of use may be confirmed by both the indicator 20 and the radar device 50. As a result, the unauthorized use of the library 2 may reliably be prevented.

Next, a modification relating to the control device is described.

The control device which uses the function of the radar device 50 etc. may be configured as a general mobile terminal, such as a tablet computer or a smart phone, instead of the ship equipment, such as the indicator 20. In this modification, the issuance application for the electronic certificate 6 may be performed by a user of the mobile terminal on behalf of the vendor, through accessing the application website.

Note that, some of the mobile terminals described above may not be capable of acquiring the MAC address by the library 2 due to a restriction on the OS etc. In this case, by using, for example, a vendor UUID (a type of UUID) as the device identification information instead of the MAC address, the authentication with substantially the same strength as the MAC address may be achieved. Here, the vendor UUID may be a value which may be acquired by the API of some types of OS, and mean an ID which takes the same value when the application is of the same vendor and the device is the same.

Next, a modification regarding the authentication file 7 is described.

In the above embodiments, the authentication file 7 may be described with the MAC address of a single indicator 20. However, MAC addresses of a plurality of indicators 20 may be described in the authentication file 7 by, for example, describing a list of a plurality of MAC addresses, describing a range of the MAC address, or describing a condition which refers only to a high-order part of the MAC address which is comprised of 48 bits. In this case, even when licensing a plurality of control devices (the indicator 20 and the mobile terminal, etc.) at once, it is unnecessary to create the authentication file 7 for the individual, and thus the workload may be reduced.

Next, a modification regarding the function restriction file and a modification regarding the certificate authority are described.

The device restriction information described in the function restriction file 8 may include the target device which the control device is permitted to use, in terms of the equipped function in the target device (e.g., whether the target device has the detection function) or the model of the target device (radar A, radar B, . . . etc.), instead of based on the type of the target device (the radar, the fish finder, the sonar, etc.). In this case, the target device which the control device is permitted to use may be identified from various points of view, and flexible authentication may be achieved.

Further, the certificate authority which issues the root certificate may be built for each equipped function or each model of the target device, instead of the type of target device. In this case, the target device may be installed with a root certificate issued by the certificate authority of which condition is satisfied by the respective target devices, among the plurality of certificate authorities. Here, even in the case where the license is granted for each equipped function or each model of the target device, the target device may suitably confirm the validity of the control device.

Although the suitable embodiments of the present disclosure are described above, the above configurations may be modified as follows, for example.

In the above embodiments, the authentication file 7 and the function restriction file 8 may be separate files from the electronic certificate 6. However, without limiting to this, for example, the device permission information, the device restriction information, and the function restriction information may be described in the electronic certificate 6 so that the authentication file 7 and the function restriction file 8 are omitted. In this case, if the contents of the license are changed etc., the electronic certificate 6 may be updated accordingly. Also, even if the contents of the device permission information etc. described in the electronic certificate 6 are falsified without authorization, the unauthorized use may be prevented since the verification of the signature on the radar device 50 side fails and the function cannot be used.

The device restriction information and the function restriction information may be described in a single file (function restriction file 8) as in the above embodiments or may be described in separate files.

When the indicator 20 or the mobile terminal is connectable to the Internet, the file of the electronic certificate 6, the authentication file 7, and the function restriction file 8 may be updated via the Internet.

In the above embodiments, the common library 2 may be installed in all the indicator 20, the radar device 50, and the fish finder 60. However, separate libraries may be used for the control device and the target device.

As the target device, in addition to the radar device 50 and the fish finder 60 described above, various devices, such as an ECDIS (Electronic Chart Display System), an AIS (Automatic Identification System), a GNSS receiver, etc. may be used.

In the above embodiments, the control device may be a ship equipment manufactured by the vendor (manufacturer) different from the manufacturer of the target device, however, it is not limited to this. For example, the control device may be manufactured by a ship equipment manufacturer which is a common manufacturer of the target device.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow views described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein are preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An authentication system, comprising:
   a control device including:
      a memory configured to store a program for controlling a target device and device restriction information indicating functions of the target device that are permitted to be used by the control device; and
      circuitry configured to:
         confirm validity of executing the program stored in the memory by confirming whether identification information of the control device satisfies a predetermined condition; and
         confirm whether the target device having a function to be used by the control device falls under a valid range of use based on the device restriction information stored in the memory,
      wherein the target device is at least one of a radar device or a fish finder for installation in a ship; and the control device is an indicator for the at least one of the radar device or the fish finder,
      wherein the memory is configured to store an encrypted authentication file including at least one of a media access control (MAC) address or a universally unique identifier (UUID), and
      wherein the circuitry is configured to:
         decrypt the authentication file;

compare the identification information of the control device to the at least one of a media access control (MAC) address or a universally unique identifier (UUID); and confirm validity of executing the program stored in the memory when the identification information of the control device matches the at least one of a media access control (MAC) address or a universally unique identifier (UUID).

2. The authentication system of claim 1, wherein the device restriction information is updatable.

3. The authentication system of claim 1, wherein the device restriction information includes at least one of an equipped function, a type, and a model of the target device that the control device is permitted to use.

4. The authentication system of claim 1, wherein the circuitry is configured to confirm whether the function of the target device falls under a valid range of use based on function restriction information included in the device restriction information.

5. The authentication system of claim 4, wherein the function restriction information is updatable.

6. The authentication system of claim 1, further comprising:
the target device including
a communication interface configured to receive an electronic certificate from the control device; and
circuitry configured to
confirm validity of the control device to use a function of the target device by verifying a signature of the received electronic certificate; and
provide a function requested from the control device according to a result of the verification of the signature.

7. The authentication system of claim 6, wherein the electronic certificate is updatable.

8. The authentication system of claim 1, wherein the target device includes
memory configured to store a root certificate of a trusted certificate authority as a trusted root certificate;
a communication interface configured to receive an electronic certificate from the control device; and
circuitry configured to confirm validity of the control device by verifying, with the trusted root certificate, whether the received electronic certificate is signed by the trusted certificate authority.

9. The authentication system of claim 8, wherein the memory of the target device stores, as the trusted root certificate, the root certificate of one of a plurality of certificate authorities built for one of each equipped function, each type, and each model of the target device, the target device satisfying a condition of the one of the plurality of certificate authorities.

10. The authentication system of claim 8, wherein the certificate authority automatically issues the electronic certificate to an applicant when an issuance application for the electronic certificate is performed via a network and satisfies a predetermined requirement.

11. The authentication system of claim 10, wherein the circuitry of the control device is configured to:
acquire the identification information included in the contents of the issuance application;
acquire device permission information in which the identification information is encrypted, the device permission information being acquired by the applicant when the issuance application satisfies the predetermined requirement;
confirm the validity of using the program stored in the memory by confirming whether the identification information of the control device satisfies the predetermined condition based on the device permission information stored in the memory of the control device.

12. The authentication system of claim 11, wherein the device permission information is configured to include identification information of a plurality of control devices.

13. The authentication system of claim 1, wherein the identification information includes a media access control (MAC) address.

14. The authentication system of claim 1, wherein the identification information includes a universally unique identifier (UUID).

15. The authentication system of claim 1, wherein the circuitry is configured to control a function of the target device when the validity of executing the program has been confirmed and the function of the target device falls under the valid range of used based on the device restriction information stored in the memory.

16. A method of authenticating a control device, comprising:
confirming, by circuitry of the control device, validity of executing a program installed at the control device by confirming whether identification information of the control device satisfies a predetermined condition; and
confirming, by the circuitry, whether a target device having a function to be used by the control device falls under a valid range of use based on device restriction information stored by the control device indicating functions of the target device that are permitted to be used by the control device,
wherein the target device is at least one of a radar device or a fish finder for installation in a ship; and the control device is an indicator for the at least one of the radar device or the fish finder,
wherein a memory of the control device is configured to store an encrypted authentication file including at least one of a media access control (MAC) address or a universally unique identifier (UUID), and
wherein the method further comprises:
decrypting, by the circuitry, the authentication file;
comparing, by the circuitry, the identification information of the control device to the at least one of a media access control (MAC) address or a universally unique identifier (UUID); and
confirming, by the circuitry, validity of executing the program stored in the memory when the identification information of the control device matches the at least one of a media access control (MAC) address or a universally unique identifier (UUID).

17. A non-transitory readable media configured to store a computer executable program, which upon execution by a processor included in a control device, causes the control device to:
confirm validity of executing a program installed at the control device by confirming whether identification information of the control device satisfies a predetermined condition; and
confirm whether a target device having a function to be used by the control device falls under a valid range of use based on device restriction information stored by the control device indicating functions of the target device that are permitted to be used by the control device, wherein the target device is at least one of a radar device or a fish finder for installation in a ship; and the control device is an indicator for the at least one of the radar device or the fish finder, wherein a memory of the control device is configured to store an encrypted authentication file including at least one of a media access control (MAC) address or a universally unique identifier (UUID), and wherein the computer executable program, upon the execution by the processor included in the control device, causes the control device to:

decrypt the authentication file;

compare the identification information of the control device to the at least one of a media access control (MAC) address or a universally unique identifier (UUID); and confirm validity of executing the program stored in the memory when the identification information of the control device matches the at least one of a media access control (MAC) address or a universally unique identifier (UUID).

* * * * *